M. D. PHELAN.
BUFFING MACHINE SHAFT.
APPLICATION FILED MAY 23, 1916.
1,323,908.
Patented Dec. 2, 1919.
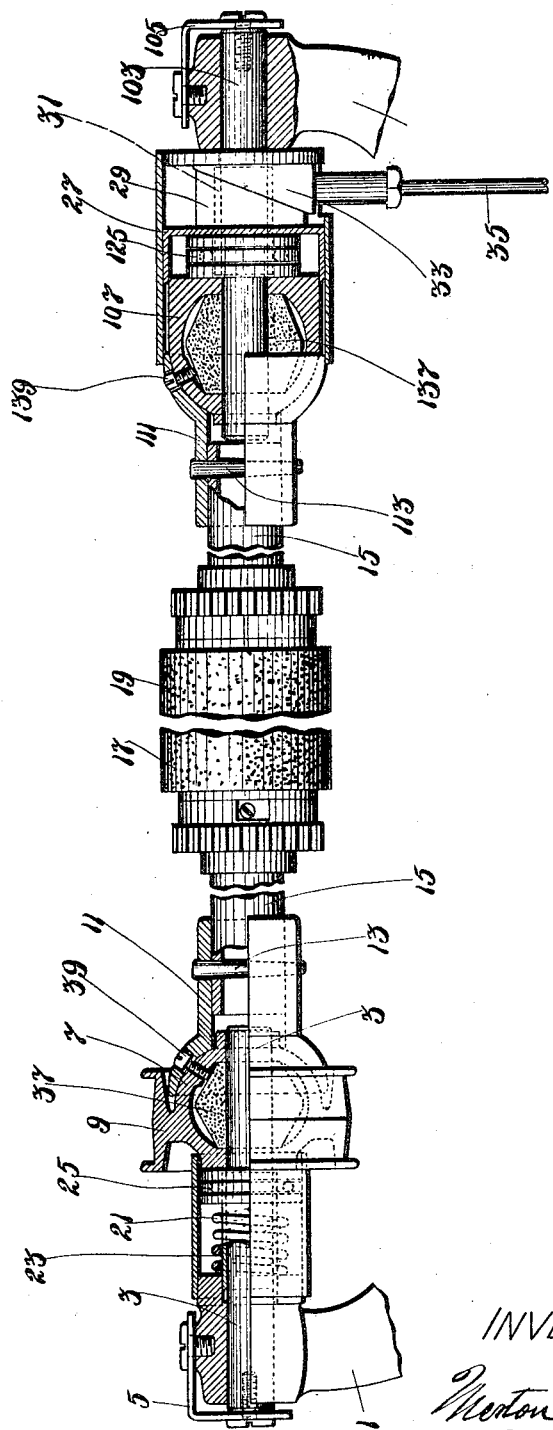
INVENTOR.

UNITED STATES PATENT OFFICE.

MERTON D. PHELAN, OF BOSTON, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

BUFFING-MACHINE SHAFT.

1,323,908.  Specification of Letters Patent.  Patented Dec. 2, 1919.

Application filed May 23, 1916. Serial No. 99,434.

*To all whom it may concern:*

Be it known that I, MERTON DAVID PHELAN, a citizen of the United States, residing at Boston, in the county of Suffolk and State of Massachusetts, have invented certain Improvements in Buffing-Machine Shafts, of which the following description, in connection with the accompanying drawings, is a specification, like reference characters on the drawings indicating like parts in the several figures.

This invention relates to machines having a rotary tool for operating upon stock and is herein illustrated in connection with a machine for buffing the soles of boots and shoes.

In such machines the shaft carrying the buffing rolls is commonly rotated at from 3000 to 4000 R. P. M. and is intermittently reciprocated about once for each eight or nine revolutions. Under these conditions it has been essential that the bearings of the shaft should be very carefully alined and that this alinement should be maintained. It is possible to secure the proper alinement at the place where the machine is manufactured, but very difficult to maintain the alinement under the different factory conditions to which such machines are subjected.

The present invention relates to the mounting of such a shaft in such a manner that a disarrangement of the alinement of the stationary bearings to any degree which would be liable to occur under factory conditions will be automatically compensated for by the taking up of a new position by the shaft itself. It should be observed in this connection that one result of such a mounting is to dispense with the careful alinement of the stationary bearings which has hitherto been necessary. One feature of the invention comprises two spaced pins having substantially coincident axes, universal joints rotatably mounted near the adjacent ends of said pins, a shaft connected at its ends to said joints, an operating tool carried by said shaft, and means for rotating said shaft.

This and other features of the invention including certain details of construction and combinations of parts will be described in connection with an illustrative machine and pointed out in the appended claims.

Referring now to the accompanying drawing,

The figure is an elevation partly in section of a buffing machine in which the present invention is embodied.

In sockets in two spaced arms 1, which are parts of the frame of the machine, are mounted two pins 3, 103, said pins being held in place by angle irons 5, 105, as shown. Rotatably and slidably mounted on the left-hand pin is the ball member 7 of a ball and socket joint, said member having formed upon it a pulley 9 to which power may be applied from any suitable source. The socket member 11 of the joint is connected by a tapered pin 13 with one end of a shaft 15 upon which are mounted the usual buffing rolls 17 and 19. The right-hand pin 103 carries a ball and socket joint similar to the one which has just been described except that no driving pulley is included, said joint being similarly connected with the right-hand end of the shaft 15. Reference numerals increased by one hundred have been applied to those parts of the right-hand construction which correspond to similar parts of the left-hand construction.

In order to urge the shaft 15, together with the universal joints, continually toward the right a coiled spring 21, which surrounds a sleeve 23, bears at one end against the frame of the machine and at the other against a ball thrust bearing 25. A similar ball thrust bearing 125 is inserted between the ball member 107 and a cup or collar 27, from the right-hand side of which projects a wedge 29, the bearing, collar and wedge being mounted on a sleeve 31. A second wedge 33, which is the complement of the wedge 29, is forked at its upper end to embrace the sleeve 31 so as to permit the wedge to be reciprocated vertically, such reciprocation being accomplished through a rod 35 which may be connected at its lower end to an eccentric or other suitable piece of mechanism driven from the same source of power as is the pulley 9. In the interior of the ball members 7, 107 are absorbent members 37, 137, designed to retain oil.

With the construction described above the parts of the ball joints are held together by the action of the spring 21 so tightly that rotation of the pulley 9 will, through friction, cause rotation of the shaft 15 together with both joints. In order, however, to facilitate setting up the machine as well as to insure that the shaft 15 shall not be retarded by pressure of work against the buffing rolls, screws 39, 139 are threaded into the ball members 7, 107 and have their heads located in enlarged holes in the socket members 11, 111. By removing these screws, oil may be supplied to the absorbent members 37, 137.

By using the comparatively small pins 3, 103 as bearing members, the shaft runs much more easily than with the usual bearings; and by providing the universal joints, the shaft 15 is permitted to accommodate its position in response to any disarrangement of the alinement of the bearing pins.

Although the invention has been set forth in connection with a particular machine, it should be understood that the invention is not limited in the scope of its application to the particular machine which has been shown and described.

Having thus explained my invention, what I claim and desire to secure by Letters Patent of the United States is:—

1. A machine of the class described having, in combination, two spaced pins having substantially coincident axes, universal joints rotatably mounted on said pins, a shaft connected at its ends to said joints, an operating member mounted on said shaft, and means for rotating said shaft.

2. A machine of the class described having, in combination, two spaced pins having substantially coincident axes, universal joints rotatably and slidably mounted on said pins, a shaft connected at its ends to said joints, an operating member mounted on said shaft, and means for rotating and reciprocating said shaft.

3. A machine of the class described, having, in combination, two spaced pins having substantially coincident axes, ball and socket joints rotatably mounted near the adjacent ends of said pins, a shaft connected at its ends to said joints, an operating tool fast to said shaft, and means for rotating said shaft.

4. A machine of the class described having, in combination, two spaced pins having substantially coincident axes, ball and socket joints rotatably and slidably mounted near the adjacent ends of said pins, a shaft connected at its ends to said joints, an operating tool fast to said shaft, and means for rotating and reciprocating said shaft.

5. A machine of the class described having, in combination, a frame having two spaced arms provided with alined sockets, pins mounted in said sockets, universal joints rotatably and slidably mounted on said pins, a shaft connected at its ends with said joints, an operating member fast to said shaft a spring for moving said shaft longitudinally in one direction, means for positively moving said shaft intermittently in the other direction, and means for rotating said shaft.

6. A machine of the class described having, in combination, two spaced pins having coincident axes, ball and socket joints rotatably and slidably mounted on said pins, a shaft connected at its ends to said joints, an operating member fast to said shaft, a pulley connected with one of said joints a spring tending to move the joints and shaft in one direction and thereby to hold the members of the joints in frictional contact, and positive means for moving said shaft intermittently in opposition to the force of said spring.

7. A machine of the class described having, in combination, two spaced pins having substantially coincident axes, ball and socket joints rotatably and slidably mounted on said pins, the ball member of each joint being hollow to serve as a receptacle for oil, a shaft connected at its ends to said joints, an operating tool mounted on said shaft and means for rotating and reciprocating said shaft.

8. A machine of the class described, having, in combination, two spaced pins having substantially coincident axes, universal joints rotatably mounted on said pins, a shaft connected at its ends to said joints, an operating member mounted on the shaft, and a spring acting to hold the parts of the joints in frictional contact.

In testimony whereof I have signed my name to this specification.

MERTON D. PHELAN.